United States Patent

[11] 3,602,543

| [72] | Inventor | Einar Sjodin |
| | | Norway |
| [21] | Appl. No. | 784,662 |
| [22] | Filed | Dec. 18, 1968 |
| [45] | Patented | Aug. 31, 1971 |
| [73] | Assignee | Munck International A/S |

[54] ARRANGEMENT IN SUCTION CUP FOR VACUUM LIFTING
2 Claims, 4 Drawing Figs.

[52] U.S. Cl. .................................................. 294/64 R, 248/363
[51] Int. Cl. ..................................................... B66c 1/02
[50] Field of Search .......................................... 294/64, 65; 248/206, 362, 363

[56] References Cited
UNITED STATES PATENTS

| 715,905 | 12/1902 | Tuck et al. .................... | 294/64 |
| 1,251,258 | 12/1917 | Magill .......................... | 294/64 X |
| 1,714,422 | 5/1929 | Hanson ......................... | 248/206 |
| 2,443,987 | 6/1948 | Morrison et al. ............... | 294/65 |
| 2,819,806 | 1/1958 | Vieth ............................ | 294/64 X |
| 2,910,264 | 10/1959 | Lindenberger ................. | 294/64 X |
| 2,960,364 | 11/1960 | Herzog ......................... | 294/65 |
| 3,165,899 | 1/1965 | Shatto .......................... | 248/363 X |
| 3,166,202 | 1/1965 | Arnold .......................... | 294/65 X |
| 3,219,380 | 11/1965 | Carliss ......................... | 294/64 |

FOREIGN PATENTS

| 687,079 | 5/1964 | Canada ......................... | 294/65 |

Primary Examiner—Evon C. Blunk
Assistant Examiner—W. Scott Carson
Attorney—Larson, Taylor & Hinds ABSTRACT: An apparatus for vacuum lifting cargo having a surface with a hole therethrough. Within a suction cup is a plate which overlies the hole, and, when the suction cup is applied to the cargo, the end plate causes a valve stem associated therewith to open a valve to a vacuum source. The plate has a check design of ribs forming a large number of open bottom chambers and a conduit leading from each chamber to the suction cup carrier. The conduits are of such a size that they permit suction of those chambers closed by the said end of the cargo and prevent large quantities of air from flowing through those conduits in communication with the cargo hole.

PATENTED AUG 31 1971 3,602,543

ARRANGEMENT IN SUCTION CUP FOR VACUUM LIFTING

The present invention relates to an arrangement concerning suction cups for vacuum lifting of cargo of the kind having one or more openings as for example paper rolls provided with a central channel.

When lifting of standing rolls is carried out by means of circular, flat lifting cups the sealing of the central core hole has been an absolute condition. Without a reliable sealing the leakage will be too large and the roll cannot be lifted.

In this connection it is known to use a plastic end plug without any hole or to seal the usual wooden plug by covering the center hole of the roll by a sheet of paper or plastic before the wooden plug is driven in. Further it is known to seal the hole with a special mandrel secured to the suction cup which mandrel expands for example by means of compressed air and thus seals the central hole.

Said known proposals have their negative sides: Plastic and wooden plugs might loosen and be disengaged or be mechanically damaged, the central mandrel is difficult to place in the central hole of the roll and this will then be without plug.

It is further known to isolate the central part of the suction cup from the hole by means of an inner, concentric sealing ring or the like so that the suction cup only takes part in the space between the two sealing rings. If one could place the suction cup sufficiently exact, the inner ring could be made only slightly greater than the central hole of the roller and the method would have been useable. But due to the inaccuracy in the placing of the cup as one in practice always will have to take into account, the inner ring will "steal" so much of the area of the suction cup that this solution in practice is unuseable.

The present invention eliminates the drawbacks of the previous proposals. No sealing of the core hole is necessary, all kinds of plugs or no plug can be used. The demands as to accurate placing is eliminated, no mandrel shall enter the center hole. The loss of suction area is only negligibly greater than the area of the central hole.

More specifically the invention relates to an arrangement concerning suction cups for vacuum lifting comprising a suction cup for the lifting of cargo as for example upright paper rolls having a central hole, the new and characterizing feature being that the suction cup at the lower side is provided with a spring or weight loaded plate which covers the hole in the roll or the like when the cup is lowered down thereon, which plate on the lower surface facing the roller end is provided with a check design of ribs made from elastic material, and that each check is connected with the interior of the suction cup by ventilation conduits.

To have a better understanding of the invention reference is had to the following description of an embodiment of the invention diagrammatically shown in the drawing.

Figure 1:
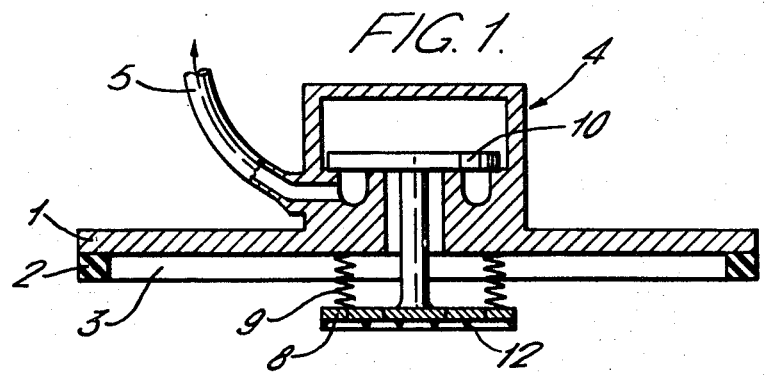
FIG. 1 is a section through a freely suspended suction cup being provided with an arrangement for isolation of the core hole.
Figure 2:
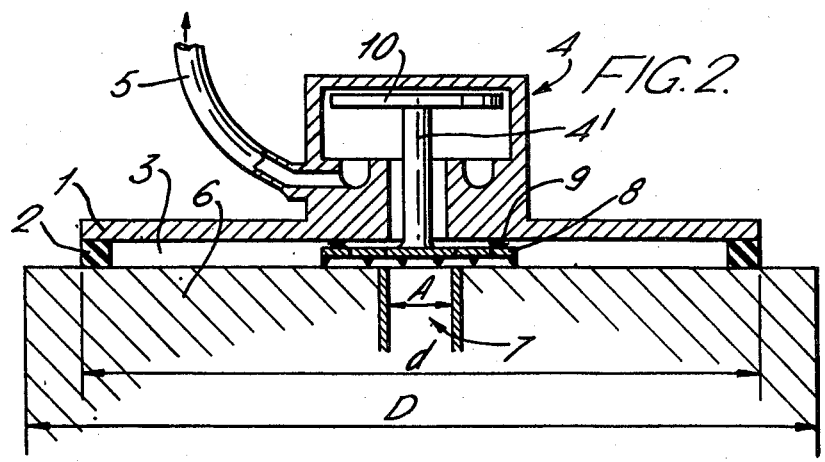
FIG. 2 shows the arrangement of FIG. 1 when resting on the end of a paper roller having an open core hole.
Figures 3, 4:
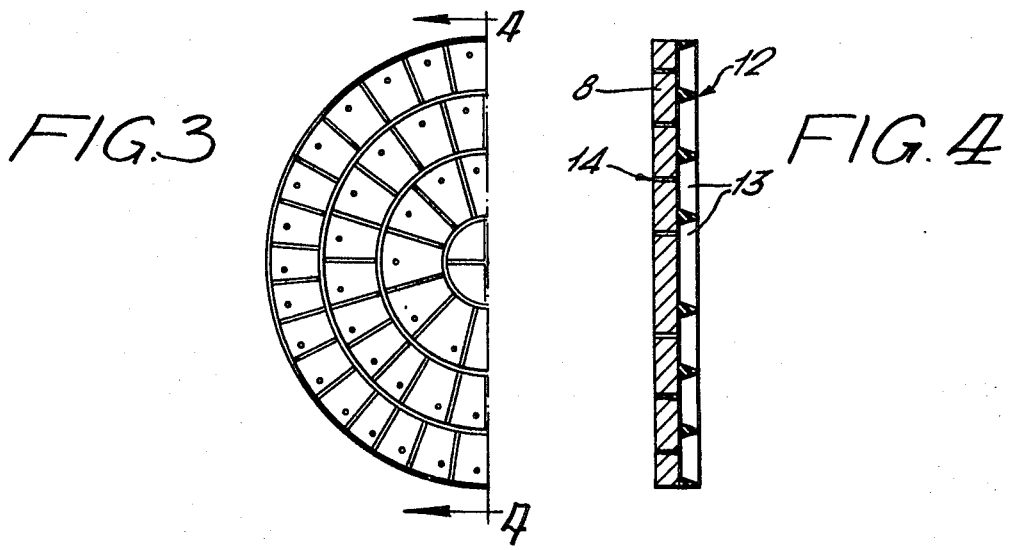
FIG. 3 shows in larger scale the lower plate of the feeler valve viewed from below.
FIG. 4 is a cross-sectional view of the lower plate, viewed along the plane 4—4 of FIG. 3.

The suction cup is provided with a rubber gasket ring 2 which limits the space 3, from a which air can be evacuated through the valve 4 when a hose 5 is connected to a suitable source of vacuum, and the feeler valve opens. Pressure springs 9 are arranged between the lower surface of the cup 1 and the upper surface of a plate 8 secured to the valve stem 4'. To the lower surface of the plate 8 is secured elastic ribs 12 forming a check design comprising a relatively large number of "chambers" 13. The valve plate 8 rests in FIG. 2 against the end of the roll 6 and covers the central part thereof including the core hole 7. The springs 9 are compressed and the valve piston 10 is lifted up and has thereby opened for the air flow out through the hose 5. The plate 8 is a steel plate at the lower surface of which is vulcanized a check design of rubber ribs 12. When the plate 8 is pressed against a base, each check will form a limited space or chamber 13. Through fine conduits 14 the air is then sucked out from these chambers, and the area of the roll end surface covered by the plate 8 is thus still active as lifting area. The conduits 14 are so dimensioned that they represent a negligible resistance against the air flow sucked out those chambers 13 which are closed off by abutting against the roll end surface. Those chambers which lie over the core hole will, however, have atmospheric pressure at the lower side, and the conduits 14 are so dimensioned that they offer a substantial resistance against a large flow of air therethrough and thus only give passage for a limited amount of leakage air into the space 3. Hoses, pumps and suction cup dimensions will have to be so adapted that this leakage can be tolerated.

If the paper roll 6 has a diameter D, the suction cup an outer diameter $d$ and the core hole a diameter $k$, the plate 8 must have radius of at least $(k+D-d)/2$.

I claim:

1. An apparatus for vacuum lifting cargo having a hole therethrough comprising a suction cup provided with a valve having a valve stem, a plate connected to said valve stem, said plate overlying the hole in the cargo and being located within the area bounded by the suction cup, the said plate opening said valve when said suction cup is applied against the cargo, said plate being provided at the side facing the cargo with ribs of elastic material forming a check design comprising a relatively large number of chambers between the said plate and the cargo when applied against the cargo, a fine conduit providing communication between each said chamber and the interior of said suction cup the cross-sectional area of each said conduit being sufficiently large that enough air can be withdrawn from those chambers facing a surface of the cargo to create a suction in said chambers, but at the same time small enough to prevent the flow therethrough of substantial quantities of air through said chambers in communication with the said hole in the cargo.

2. The apparatus according to claim 1, in combination with a cargo having a circular end surface with a hole passing therethrough, wherein the plate has a radius of $(K+D-d)/2$, wherein $K$ is the diameter of the said cargo hole, $D$ is the diameter of the circular end surface of the cargo and $d$ is the outer diameter of the suction cup.